(12) United States Patent
Lepper

(10) Patent No.: US 7,306,419 B2
(45) Date of Patent: Dec. 11, 2007

(54) FASTENER

(75) Inventor: Mark Lepper, Toronto (CA)

(73) Assignee: Illinois Tool Works Inc, Glenview, IL (US)

( * ) Notice: Subject to any disclaimer, the term of this patent is extended or adjusted under 35 U.S.C. 154(b) by 132 days.

(21) Appl. No.: 11/341,205

(22) Filed: Jan. 27, 2006

(65) Prior Publication Data

US 2006/0207068 A1 Sep. 21, 2006

Related U.S. Application Data

(60) Provisional application No. 60/663,889, filed on Mar. 21, 2005.

(51) Int. Cl.
*F16B 19/00* (2006.01)
(52) U.S. Cl. ...................... 411/508; 411/453
(58) Field of Classification Search ........ 411/508–510, 411/913, 554, 555; 24/453
See application file for complete search history.

(56) References Cited

U.S. PATENT DOCUMENTS

| | | | | |
|---|---|---|---|---|
| 3,722,037 A | * | 3/1973 | Jaeger | 411/508 |
| 4,422,222 A | * | 12/1983 | Notoya | 24/614 |
| 4,524,494 A | * | 6/1985 | Sato et al. | 24/453 |
| 4,604,776 A | * | 8/1986 | Takahashi | 24/453 |
| 5,186,591 A | * | 2/1993 | Malks | 411/508 |
| 7,017,239 B2 | * | 3/2006 | Kurily et al. | 24/297 |

* cited by examiner

*Primary Examiner*—Flemming Saether
(74) *Attorney, Agent, or Firm*—Mark W. Croll; Paul F. Donovan

(57) ABSTRACT

A snap-fit fastener having deflectable, diverging wings extending from a distal end of a pedestal is provided with lead-in extensions from the connection of each wing to the pedestal. The extensions define a slot therebetween and are curved relative to the wings. By inserting an implement such as a screwdriver in the slot and twisting the implement, the lead-in extensions are spread relative to each other and the wings are moved toward the pedestal to allow the fastener to be disconnected from an object.

5 Claims, 2 Drawing Sheets

FASTENER

CROSS-REFERENCE TO RELATED APPLICATIONS

The present regular United States Patent Application claims the benefit of U.S. Provisional Application Ser. No. 60/663,889 filed Mar. 21, 2005.

FIELD OF THE INVENTION

The present invention relates generally to fasteners, and more particularly to snap-fit fasteners made of plastic.

BACKGROUND OF THE INVENTION

Snap-fit plastic fasteners for securing one item or part to another in an assembly are used in many industries for many purposes. Such fasteners are known in a variety of shapes and configurations, and may have snap-fit connections to each component, interlocking engagement to one component, threaded engagement to one component or to a second fastener component and various other attachment configurations.

It is known in automotive applications to have one or more components that are pre-assembled at one location and shipped to another location for assembly with one or more other components. The pre-assembly may include installation of a fastener, such as a bolt and nut. The nut may be attached to the bolt prior to final assembly, requiring that the nut be removed from the bolt during final assembly only to be reattached to the bolt upon final assembly. So called part-in-assembly (PIA) applications wherein the fastener is connected to one part and transported to another location for final assembly in which the part with fastener is installed on the automobile have achieved broad acceptance. However, disassembly of a bolt and nut fastener is time consuming and sometimes problematic in that the removed nut can be dropped or misplaced, requiring that a spare nut be available for use. When a fastener having a nut is used, it is also necessary to keep the end of the fastener exposed for access to the nut until final assembly is completed. In other applications, a pre-assembly may only include a bolt. The nut is later assembled to the bolt during final assembly at the manufacturing plant. The nut increases cost, assembly time and sometimes requires the use of specialized tools.

Various types of deflectable fasteners, so-called "snap-fit" fasteners, have also been used in which one or both ends of the fastener are adapted for inward deflection as the fastener is forced into a hole of a part in which it is installed. The deflectable portion rebounds outwardly after passing through the hole, securing the fastener in the hole of the part. These types of fasteners have advantages in that the fastener is one-piece and can be assembled quickly by merely pushing the fastener into the part or pushing the part onto the fastener. Such fasteners also provide advantages in so-called blind fastening assemblies, wherein the first and second parts overlie each other covering the hole and the fastener, or in other applications there is no access to the inside of the hole or the installed fastener. For example, it is known to use snap-fit PIA assemblies to attach molding to a vehicle body.

A disadvantage of such fasteners is that the fastener can be difficult to remove. In some applications and uses, the retention force requirement is high such that the parts are not easily pulled off the fastener. Accordingly, such fasteners can be designed with relatively easy inward deflection of the components for insertion through a hole but configured such that the part is not easily deflected for extraction. In some situations, the fastener must be broken or otherwise damaged to remove one part from the other. When reapplying automobile trim to an automobile body, for example, it may be necessary to provide all new fasteners if the original fasteners are damaged upon removal of the trim for body repair or other servicing. Replacing the fasteners when reattaching the molding is both inconvenient and expensive. Further, removal is difficult and can be time consuming.

There is a need for a snap-fit fastener that can be pushed into parts for connection without requiring difficult attachment procedures, with the fastener being one piece and having a high extraction force but being removable and reusable.

SUMMARY OF THE INVENTION

The present invention provides a snap-fit fastener having deflectable wings that deflect inwardly for insertion of the fastener through a hole and rebound outwardly after passing through the hole to retain the fastener in the article. The fastener can be manipulated with a tool to cause the wings to deflect inwardly for detachment of the fastener from the component.

In one aspect thereof, the present invention provides a fastener with an anchor, and a pedestal extending from the anchor and having a distal end area First and second wings are connected to the pedestal via first and second hinge regions. The hinge regions are disposed near the distal end of the pedestal. The wings extend along and outwardly from the pedestal toward the anchor. First and second extensions are connected to the wings through the hinge regions, and define a slot therebetween having an entrance thereto axially outwardly from the pedestal. The first and second extensions are twisted relative to the wings.

In another aspect thereof, the present invention provides a fastener with an anchor portion having a head and a neck and a connecting portion having a pedestal and opposed laterally extending wings from a distal end area of the pedestal. The wings angle outwardly from the distal end area toward the anchor portion. A lead-in extension is associated with each wing. The lead-in extensions are twisted in a common direction relative to the wings and define a slot therebetween.

In a still further aspect thereof, the present invention provides a method for using a snap-in fastener having an anchor portion, a pedestal extending from the anchor portion and laterally extending wings from a distal end of the pedestal. The method has steps of: providing lead-in extensions from a hinged connection of the wings to the pedestal; providing a curvature to the lead-in extensions relative to the wings; providing a slot between the lead-in extensions; inserting an implement into the slot; and rotating the implement in the slot and thereby spreading the lead-in extensions and moving the wings toward the pedestal.

An advantage of the present invention is providing a snap-fit fastener that is easily attached and easily detached, while providing a high retention force.

Another advantage of the present invention is providing a snap-fit fastener that is one piece, requiring only a single operation for final installation.

Still another advantage of the present invention is providing a snap-fit fastener that can be manufactured easily and inexpensively.

Other features and advantages of the invention will become apparent to those skilled in the art upon review of the following detailed description, claims and drawings in which like numerals are used to designate like features.

Figure 1:
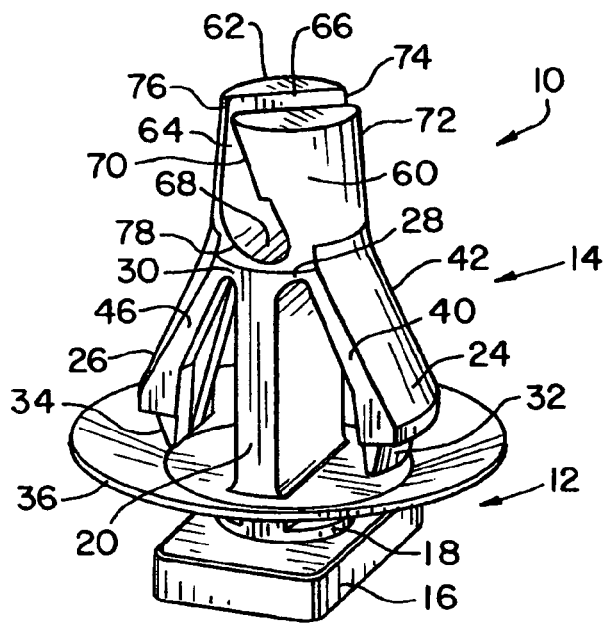
FIG. 1 is a perspective view of a fastener in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fastener in accordance with the present invention. Fastener 10 is configured for securing one part or component (not shown) such as an automobile molding to a second part or component (not shown) such as an automobile body. Accordingly, fastener 10 includes an anchor portion 12 for connection to one of the components and a connecting portion 14 for attachment to the other component. It should be understood that the general size and shape can vary for the particular application of the present fastener without departing from the scope of the present invention.

In the exemplary embodiment shown, anchor portion 12 includes a head 16 and a neck 18. Head 16 is rectangular, being longer in one direction than in another as can be seen from a comparison of FIG. 2 and FIG. 3. As such, anchor portion 12 can be secured in a slot, such as a keyhole slot or other suitable fixture. For example, so-called dog-house fixtures can be used. It should be understood that other types of anchor portions also can be used including snap-fit or other types of connections, including threaded connections. Preferably, anchor portion 12 is configured together with the component to which it attaches such that after being fixed in position, anchor portion 12 restricts fastener 10 from rotating.

A pedestal 20 extends away from neck 18 and includes a distal end area 22 remote from neck 18. First and second lateral wings 24, 26 are connected by hinge regions 28 and 30, respectively, to pedestal 20 at distal end area 22. First wing 24 and second wing 26 extend substantially along pedestal 20 but angle outwardly from pedestal 20 in the direction away from hinge regions 28, 30. Wings 24, 26 include wing ends 32, 34 recessed inwardly slightly. In known fashion, wings 24, 26 can be deflected inwardly as fastener 10 is inserted through a hole or other opening in an item, allowing fastener 10 to be inserted therein until wings 24, 26 clear the opening and rebound again outwardly. Depending on the outward angle of wings 24, 26, the resistance offered by hinge regions 28, 30 and the like, fastener 10 can be configured to resist pullout with different retention force. An umbrella seal 36 can be provided, in known fashion, at the transition between neck 18 and pedestal 20 to provide a seal along a surface of an object attached to connection portion 14.

First and second wings 24, 26 are positioned in substantially direct opposed relationship, on opposite sides of pedestal 20. In the exemplary embodiment, wings 24, 26 are substantially straight edged bodies but also can be of other shapes. Wing 24 has first and second side edges 40, 42 extending from hinge region 28 toward first wing end 32. Similarly, second wing 26 includes a third edge 44 and a fourth edge 46 that extend from hinge region 30 toward second wing end 34. Being positioned on opposite sides of pedestal 20, first and second wings 24, 26, respectively are spaced from each other. Accordingly, first side edge 40 is spaced but rotationally adjacent to fourth side edge 46, being separated therefrom by a space designated generally with reference number 48 in the drawings. Similarly, second and third side edges 42, 44 are rotationally adjacent each other but spaced from each other by a space designated generally with reference number 50 in the drawings.

First and second lead-in extensions 60, 62 are connected to first and second wings 24, 26 via first and second hinge regions 28, 30, respectively. First and second lead-in extensions 60, 62 are twisted bodies not in direct alignment with, but rotationally offset from the respective wing 24, 26 to which each is connected. A slot 64 is defined between first and second lead-in extensions 60, 62 and includes a substantially straight entrance or opening 66 and a base 68.

First and second lead-in extensions 60, 62 are rotationally offset or twisted relative to first and second wings 24, 26. Accordingly, first lead-in extension 60 has a first slot edge 70 rotationally outward of first side edge 40 and angularly disposed or curved toward first side edge 40. Stated in another way, first slot edge 70 commences at entrance 66 in a location axially aligned with space 48 between fourth side edge 46 and first side edge 40 and extends therefrom in a curved path toward first side edge 40 at hinge region 28. A second slot edge 72 is provided on the opposite side of extension 60 from first slot edge 70, and extends in a curved line from a position at entrance 66 axially aligned between first and second side edges 40 and 42 toward second side edge 42 at hinge region 28.

Lead-in extension 62 is configured similarly to lead-in extension 60 and is positioned with respect to second wing 26 similarly to the positioning of first extension 60 with respect to first wing 24. Accordingly, second lead-in extension 62 includes a third slot edge 74 commencing at entrance 66 outwardly of second wing 26, axially aligned with space 50 between second side edge 42 and third side edge 44. Third slot edge 74 angles or curves toward second wing 26 and specifically third side edge 44 thereof at second hinge region 30. A fourth slot edge 74 on the opposite side of second lead-in extension 62 commences at a location on entrance 66 axially aligned with second wing 26 between third and fourth sides edges 44, 46 and angles toward fourth side edge 46 at second hinge region 30.

Figure 2:
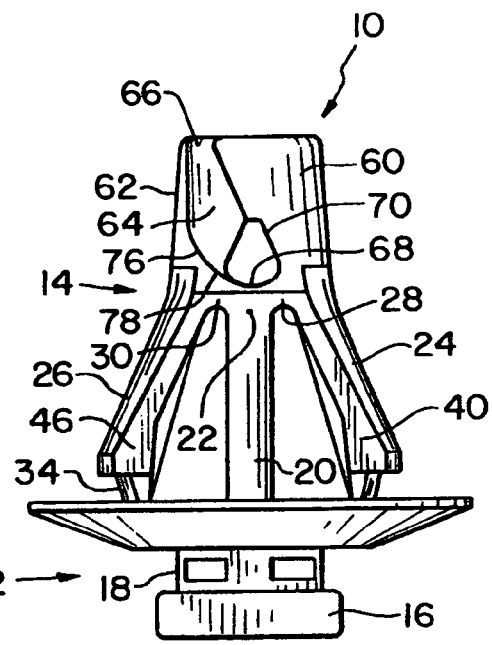
FIG. 2 is an elevational view of the fastener shown in FIG. 1.
Figure 4:
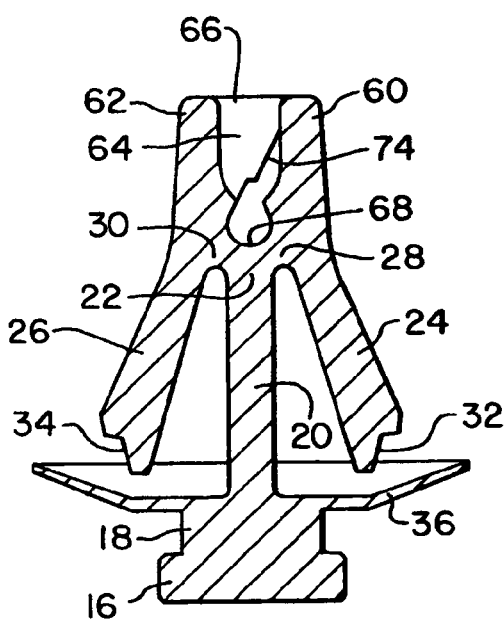
FIG. 4 is a cross-sectional view of the fastener shown in FIGS. 1-3, the cross-section being taken along line 4—4 of FIG. 3.
Figure 3:
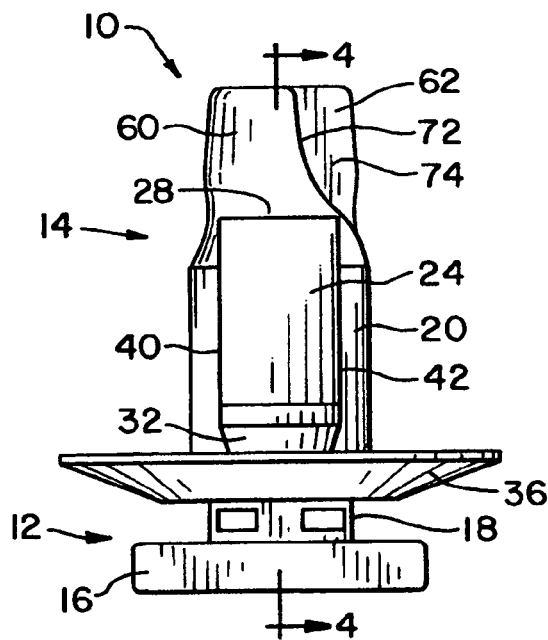
FIG. 3 is an elevational view of the fastener shown in FIGS. 1 and 2, illustrated rotated approximately 90° from the position shown in FIG. 2.

Slot base 68 continues the curvature defined by the aforementioned slot edges between lead-in extensions 60, 62. Accordingly, as can be seen in FIG. 1, a base outer edge 78 of base 68 extends between fourth slot edge 76 and first slot edge 70, along distal end area 22 of pedestal 20 and between hinge region 28 and hinge region 30. As can be seen in FIG. 2, on the opposite side of base 68 from base outer edge 78, a second base outer edge 80 extends between second slot edge 72 and third slot edge 74, along distal end area 22 of pedestal 20 and between hinge region 28 and hinge region 30.

Figure 6:
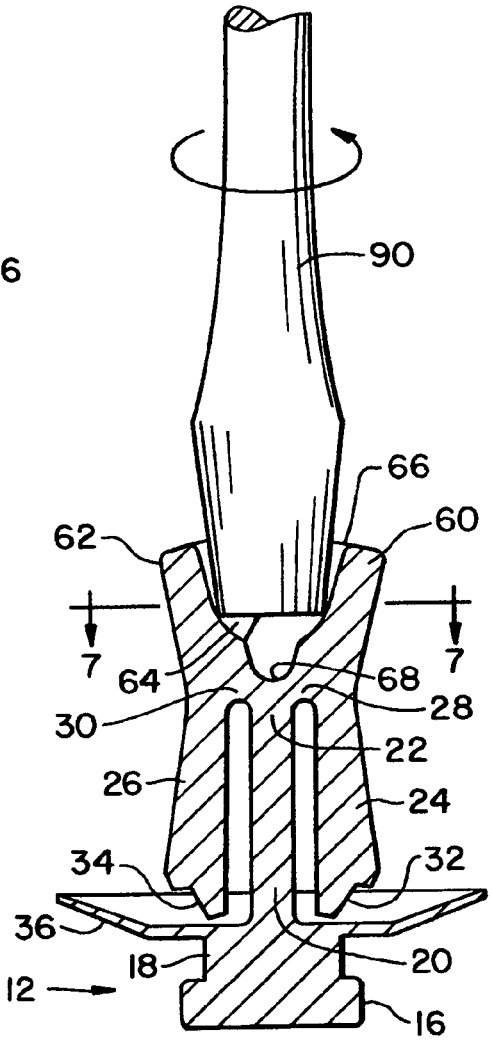
FIG. 6 is a cross-sectional view similar to that of FIG. 4 but illustrating the fastener being manipulated with a screwdriver for detachment.

In use, anchor portion 12 is secured to an appropriate fixture and a part or component is inserted via a hole therein (not shown) over connection portion 14 to be lodged against umbrella seal 36 and wing ends 32, 34. To remove the component secured to connection portion 14, first and second wings 24, 26 must be collapsed toward pedestal 20 to allow extraction back through the opening of the component. The present invention provides an easy, simple manner by which to disconnect fastener 10. A screwdriver 90 (FIGS. 6 & 7) or other straight bladed implement is inserted in slot 64 via entrance 66. Counterclockwise rotation of screwdriver 90 as illustrated in FIG. 6 causes outward deflection of lead-in extensions 60, 62 (FIG. 7) and corresponding inward deflection of first and second wings 24 and 26 via first and second hinge regions 28, 30. In the inwardly adjusted position shown in FIGS. 6 and 7, connection portion 14 can be extracted from the hole of a part or component in which it is secured.

Figure 5:
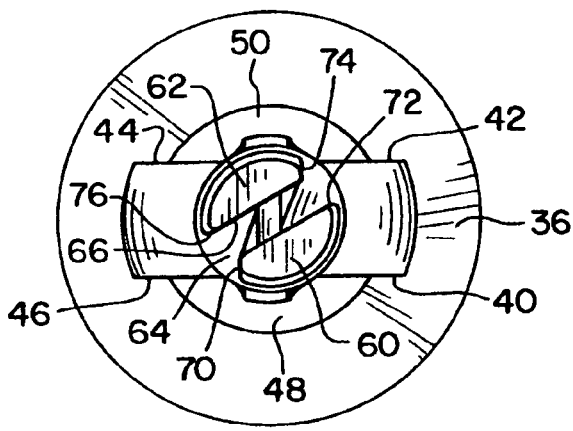
FIG. 5 is a top view of the fastener shown in the preceding drawings.

As shown and described for the exemplary embodiment, first and second lead in extensions 60, 62 are twisted in a clockwise direction relative to first and second wings 24, 26 as viewed in the end view of FIG. 5. However, it should be understood that lead in extensions 60, 62 can be curved in the opposite direction as well. It should be understood that if lead in extensions 60, 62 are twisted in the opposite direction from that shown, rotation of screwdriver 90 will be in a clockwise direction to spread lead in extensions 60, 62 and thereby adjust wings 24, 26 inwardly.

Figure 7:
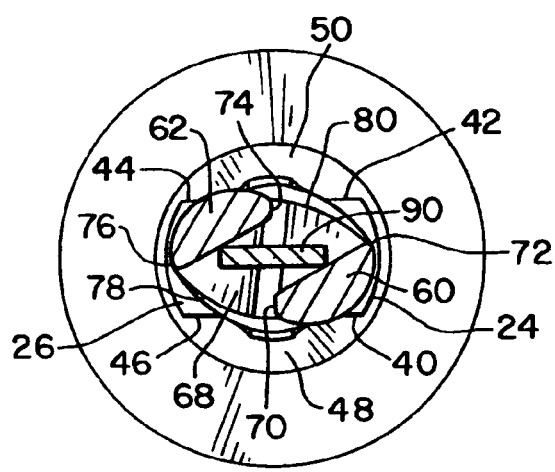
FIG. 7 is a cross-sectional view of the fastener and screwdriver shown in FIG. 6, the view of FIG. 7 being taken along line 7—7 of FIG. 6.

Fastener 10 can be provided with significantly high extraction resistance with strong, rigid hinge regions 28, 30, and with first and second wings 24, 26 extending significantly beyond the edge defining a hole in which fastener 10 is secured. However, fastener 10 need not be broken or have the integrity thereof impaired if the connection to a part or component is reversed. By inserting screwdriver 90 or other implement and rotating as illustrated in FIGS. 6 and 7, wings 32 and 34 are adjusted for removal without compromising the integrity of fastener 10. Accordingly, when screwdriver 90 is extracted from slot 64, wings 32, 34 will rebound outwardly, and fastener 10 is suitable for reuse.

The installed condition of wings 24, 26 can be with wing ends 32, 34 engaged within a hole or slot of the item to which fastener 10 is connected. As such, lead-in extensions 60, 62 can be held in a moderate outwardly deflected condition, thereby enlarging a width entrance 66 for easy insertion of screwdriver or implement 90.

Fastener 10 can be made of suitable plastic, and is conducive to injection molding or other inexpensive manufacturing techniques. Accordingly, fastener 10 can be provided inexpensively.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener comprising:
    an anchor;
    a pedestal extending from said anchor and having a distal end area away from said anchor;
    first and second wings connected to said pedestal via first and second hinge regions, respectively, said hinge regions being disposed near said distal end area of said pedestal, said wings extending along and outwardly from said pedestal toward said anchor;
    first and second extensions connected to said wings through said hinge regions, and defining a slot therebetween having an entrance thereto axially outwardly from said pedestal;
    said first and second extensions being twisted relative to said wings;
    said first wing having first and second side edges and said second wing having third and fourth side edges;
    said second edge being rotationally adjacent and spaced from said third edge and said fourth edge being rotationally adjacent and spaced from said first edge;
    said first extension having a first slot edge commencing at said entrance in a position axially aligned in the space between said first and fourth side edges and extending therefrom toward said first side edge;
    said first wing including a second slot edge commencing at said entrance in a position axially aligned with said first wing between said first and second side edges extending therefrom toward said second side edge;
    said second extension including a third slot edge commencing at said entrance in a position axially aligned in the space between said second and third side edges and extending therefrom toward said third side edge; and
    said second extension including a fourth slot edge commencing at said entrance in a position axially aligned with said second wing between said third and fourth side edges and extending therefrom toward said fourth side edge.

2. The fastener of claim 1, including an umbrella seal facing said wings.

3. The fastener of claim 1, said first, second, third and fourth side edges of said first and second wings being substantially straight edge.

4. The fastener of claim 1, said first, second, third and fourth slot edges of said first and second extensions being curved edges.

5. The fastener of claim 4, said slot having a curved base.

* * * * *